(No Model.)
L. NATHAN.
MANUFACTURE OF ARTIFICIAL MARBLE.
No. 524,907. Patented Aug. 21, 1894.
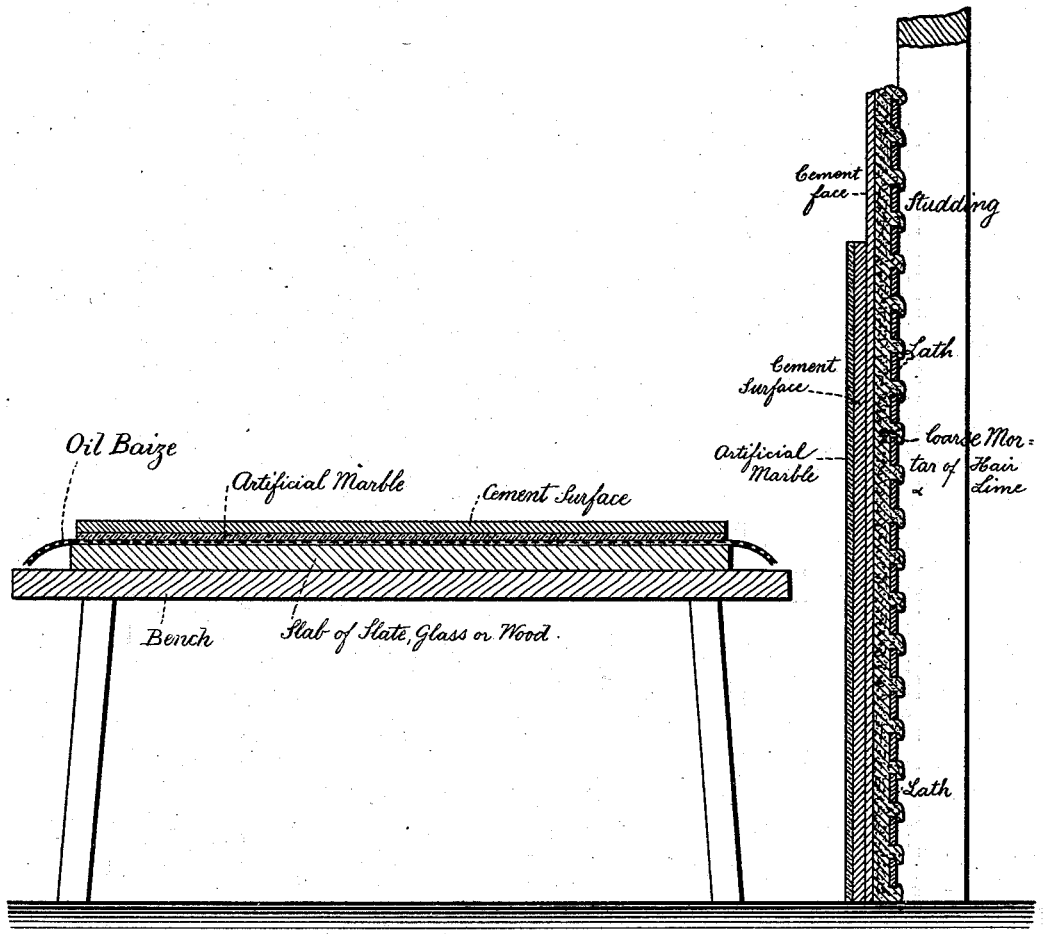

UNITED STATES PATENT OFFICE.

LEWIS NATHAN, OF LONDON, ENGLAND.

MANUFACTURE OF ARTIFICIAL MARBLE.

SPECIFICATION forming part of Letters Patent No. 524,907, dated August 21, 1894.

Application filed September 28, 1893. Serial No. 486,727. (No specimens.)

*To all whom it may concern:*

Be it known that I, LEWIS NATHAN, a subject of the Queen of Great Britain and Ireland, residing at London, England, have invented certain new and useful Improvements in the Manufacture of Artificial Marble, of which the following is a specification.

My invention relates to improvements in the preparation and mode of securing to surfaces, of artificial marble suitable for decorating walls, ceilings, alcoves, curves, columns, dados and other parts, places or surfaces, whereby I am enabled to manufacture and apply the marble in a plastic state to surfaces to which it is cemented throughout before becoming hardened, the whole operation being carried on in or near the building which is to be decorated or ornamented. In this way I avoid the disadvantage of manufacturing the marble away from the building, as heretofore, and then transporting it thereto in hardened slabs to be attached to the surfaces by screws, dowels or other devices, which method renders the marble liable to get chipped and broken in transit, and in sawing and lifting, and which besides being more costly and less durable, causes the marble to warp at the parts where the pieces are to join together. This method moreover occupies a much longer period of time and is more difficult to carry out than that forming the subject of my improvements, and in the case of columns, moldings and the like, requires costly models, molds and other appliances.

In order to enable others skilled in the art to which my invention relates to manufacture and use the same, I proceed to describe fully the manner of carrying it into practice and have illustrated the same by a diagrammatic drawing, in which is shown a section of a wall and an elevation of a bench on which the marble is prepared.

In carrying out my invention the surface to be decorated or ornamented, say for instance a brick wall or a lathed partition, is first prepared in the usual way by a plasterer with coarse mortar mixed with hair and lime to which is added a small portion of plaster or cement, preference being given to Keen's cement, to cause the coarse mortar to set quickly. When this mortar is applied to the wall or surface it is floated over with a float, or straight edge, in the usual way, so as to made it perfectly level. It is then allowed to set and when hard enough is sprinkled with water to avoid suction. I then take coarse Keen's or other cement, previously mixed in a banker, and lay it onto the facing with a float or trowel and level it off with a straight edge to the desired thickness, say about one-fourth of an inch. The surface or wall is now allowed to set until of sufficient hardness that the pressure of the finger will not make any indentation therein, but not hard enough to cause any suction in it, as suction will cause the marble facing when applied to go dead in patches or round holes. It therefore requires great caution and skill to catch the wall or surface in the right stage of hardness. I now proceed to make the marble for the facing, say for instance a sienna marble. For this purpose I use a bench, the length of which should be that of the height of the wall or surface to be covered. The face of this bench, which must be perfectly smooth, may be made of slate, glass or wood, preference being given to the last named on account of its portability, and seeing that the marble is to be used where it is to be manufactured. The bench face, when planed down smooth, must be coated with shellac to render it impervious to moisture. I then take a piece of oil baize and lay it on the bench with the smooth face downward and thoroughly sponge the back with clean water, also the bench. I next turn the oil baize over so that its smooth surface comes uppermost and then rub it over with a damp sponge so as to express the superfluous water and air from underneath. After this, the oil baize is wiped thoroughly dry with a rag. Great care must be taken so that no wrinkles are formed in the oil baize. I then cut the oil baize to the required length and rub its surface over with a cloth dipped in lard oil. I now prepare the artificial marble on oil baize or upon other suitable pliable and removable foundation and according to any of the ordinary methods, and after having smoothed down the surface of the marble I place a piece of thin wet calico thereon and take some dry coarse cement and cover the calico, in order to absorb the water from the marble, and I allow this calico and cement covering to remain on the marble for about two or three minutes. The calico with its cement covering is then removed from the marble, and any cracks which may have formed are then troweled together and the whole of the marble is likewise troweled so as to disperse any air bubbles that may have formed by the throwing of the different tints onto the oil baize. Cement (either superfine or coarse) mixed with water and of the same tint as the marble is then laid over the surface of the marbled sheet so as to form a backing and is leveled to the desired thickness by drawing a straight edge across the before mentioned straight edges. It is then dried as before described and troweled again and will bear being carried from the bench to the wall to which it is to be applied. For the purpose of such transport and in dealing with long strips I prefer to wind the marble and oil baize onto a wooden roller, the said roller being applied perfectly parallel with the bottom edge of the marble and oil baize, or the sheet may be carried on the oil baize alone. Water is now sprinkled on the wall or surface and some of the tinted cement mixed with water to about the consistency of cream is brushed on it, the object being to prepare the wall or surface for the reception, and which is very important to cause the sheet to adhere firmly and closely to the wall or surface so as to be affixed thereto without any extraneous fastening and to become one with and part of the actual surface of the wall or foundation to which it is applied. Care must be taken to brush this cement on equally and that too much should not be employed. The roll of marble and oil baize, or the sheet with its support of oil baize, is then lifted up bodily and carried to the surface or part to which it is to be applied, and in the case of employing a roll the free end of the sheet is placed parallel thereto. The marble sheet is then unrolled very slowly and is pressed by india rubber rollers or other suitable appliances onto the wall until the entire sheet is unrolled, it being of great importance to press the roll very closely so as to prevent the air from getting between the marble sheet and the wall. If the slab is to be affixed without the aid of a roller the operation is carried out in like manner, and the sheet of marble may be removed bodily upon the oil baize and applied to the surface. The sheet is thus applied to the foundation which is to support it. The surface thus applied is then allowed to stand for a short time, according to the condition of the marble, as the marble must be just hard enough to allow of the oil baize being removed by withdrawing it very slowly from its face, for if it be withdrawn too quickly and the marble be not hard enough it will drag the face. When the oil baize is taken off, it is laid face downward on the bench and washed with a sponge, then turned over and its face washed. It is then dried and oiled and prepared as before described for the reception of the next gage of marble.

It is essential that every particle of cement should be washed off the back of the oil baize and off the face of the bench, as otherwise when treating the next batch, depressions or hollows will be formed therein.

One advantage of my invention is that I am enabled to break the joints or seams of each layer of marble as they are placed next to each other against the walls or ceilings, and for this purpose I use a knife having a sharp point and commence cutting at a place where the vein ends abruptly, and trace that vein through into the next piece of marble to a vein of the same color. This knife leaves a cut or parting crack where it has been used. I then take an ordinary glass syringe provided with an india rubber bulb at one end by means of which I draw up into the bulb some of the stain of the same color as the vein required to be connected and place the point of the glass syringe into the highest point of the cut and force out as much of the stain as is necessary to fill the crack. When this is done I press the crack together with a trowel; this leaves a smear over the marble which will disappear at the first stoning or rubbing down of the marble.

In cases where oil baize cannot be used, I employ paper and prepare it in the same manner as the oil baize, but with this exception, I do not oil it.

The marble should be stoned or rubbed down as soon as it is sufficiently hard, for if it be allowed to stand too long the labor is more costly. It requires to be rubbed down three times and "stopped" three times with the same colors as used on it. The first rubbing should be effected with a rough quick cutting stone, the second with one of a finer grit, the third with snake stone. The marble must then be allowed to stand until it is perfectly dry, then cleaned off and polished with putty powder or other suitable material.

For inlaid and mosaic work on walls, ceilings, &c., I first prepare the surface to which the marble is to be applied, in the same manner as before described and make the marble on a glazed or oily paper. I then take a piece of calico which has been dipped into superfine cement and tinted same color as the marble, and rub it onto the back of the marble. I then lift the marble, calico, and paper and cut it with a knife or other suitable instrument into the shape or design required, and after taking the calico off, apply the marble to the wall or ceiling.

In some cases where the design forms a difficult scroll or pattern, I prepare a zinc profile, then lay sheets of the marble onto the wall in the manner as before described, then take the zinc profile and lay it in position on the face of the marble. I then take a sharp pointed knife and trace round the edge of the profile, cutting through to the coarse cement on the wall or ceiling. I then take a suitable tool and pick out all those parts of the scroll or pattern required to be filled in with a marble or marbles of another color or colors.

For straight strips I marble on oiled or glazed paper and cut it with a knife or sharp instrument against a straight edge to the dimensions required. I then take a piece of calico dipped into tinted superfine cement of the same color as the marble and apply the calico to the back of the marble to allow it to be handled without breaking. I then remove the marble from the bench and lay it onto a board, then brush some tinted cement onto the wall or ceiling, then remove the calico, roll the strip of marble and paper onto a roller, and then unroll against the wall or ceiling to the position required.

I claim as my invention—

1. The improvement in the art of manufacturing artificial marble for decorative purposes hereinbefore set forth, which consists in preparing the artificial marble on a removable pliable foundation which has been previously wetted and pressed upon the wetted surface of the work-bench or table and then dried and oiled, spreading over the same a layer of wet cement to form a backing and to cause it to adhere to the surface to which it is to be affixed, transferring the removable foundation with the plastic marble to the previously prepared surface to be covered, pressing the plastic marble against the said surface to cause it to adhere thereto without the use of screws, dowels or other extraneous means, then removing the pliable foundation and finally stoning and polishing the marble.

2. The improvement in the art of manufacturing artificial marble hereinbefore set forth, which consists in preparing the same on a sheet of oil baize previously wetted and pressed on the wetted surface of the work bench or table and then dried and oiled, spreading over the marble a layer of wet cement, applying wet cement to the surface to be decorated, transferring the oil baize with the plastic marble to such surface with the cement side thereto, pressing the same to cause the cement and marble to adhere, and then removing the oil baize and finally stoning and polishing the marble.

3. The improvement in the art of manufacturing artificial marble hereinbefore set forth, which consists in preparing the same on a pliable removable foundation, applying a sheet of calico thereto, covering the calico with a layer of dry cement to remove moisture from the marble, removing the calico, spreading a fresh layer of wet cement over the marble, applying wet cement to the surface to be decorated, transferring the plastic marble on the foundation to such surface with the cement side thereto, then removing the pliable foundation, and finally stoning and polishing the marble.

4. The improvement in the art of manufacturing artificial marble hereinbefore set forth and suitable for inlaid or mosaic work, consisting in preparing the same on a removable pliable foundation, applying a piece of calico to the back of the marble, cutting the marble with the foundation and calico to the shape required, removing the calico and applying the marble to the surface to be decorated, and then stoning and polishing the marble.

5. The method herein specified of decorating with imitation of marble, consisting in spreading a pliable foundation material in a wet condition upon a work bench, removing surplus moisture and oiling the surface, preparing thereon the layer of artificial marble and spreading over the same plastic cement to form a backing, preparing the surface to be covered by a layer of cement and transferring thereto the previously prepared layer of plastic marble by means of the pliable foundation and applying sufficient pressure to cause the cements to adhere together, and afterward removing the pliable foundation, substantially as specified.

6. The method herein specified of decorating with imitation of marble, consisting in spreading a pliable foundation material in a wet condition upon a work bench, removing surplus moisture and oiling the surface, preparing thereon the layer of artificial marble, removing surplus moisture and spreading over the same plastic cement to form a backing, preparing the surface to be covered by a layer of cement and transferring thereto the previously prepared layer of plastic marble by means of the pliable foundation and applying sufficient pressure to cause the cements to adhere together, and afterward removing the pliable foundation, substantially as specified.

7. The method herein specified of decorating with imitation of marble, consisting in spreading a pliable foundation material in a wet condition upon a work bench, removing surplus moisture and oiling the surface, preparing thereon the layer of artificial marble, removing surplus moisture through a suitable cloth and spreading over the same plastic cement to form a backing, preparing the surface to be covered by a layer of cement and transferring thereto the previously prepared layer of plastic marble by means of the pliable foundation and applying sufficient pressure to cause the cements to adhere together, and afterward removing the pliable foundation, substantially as specified.

8. The method herein specified of decorating with imitation of marble, consisting in spreading a pliable foundation material in a wet condition upon a work bench, removing surplus moisture and oiling the surface, preparing thereon the layer of artificial marble, removing surplus moisture through a suitable cloth and spreading over the same plastic cement to form a backing, preparing the surface to be covered by a layer of cement and transferring thereto the previously prepared layer of plastic marble by means of the pliable foundation and applying sufficient pressure to cause the cements to adhere together, and afterward removing the pliable foundation, and grinding or polishing the surface after the cements have set, substantially as specified.

In witness whereof I have hereunto signed my name in the presence of two subscribing witnesses.

LEWIS NATHAN.

Witnesses:
E. H. HARBERD,
WALTER J. SKERTEN.